US012176741B2

(12) United States Patent
Tsai

(10) Patent No.: US 12,176,741 B2
(45) Date of Patent: Dec. 24, 2024

(54) BATTERY CHARGE AND DISCHARGE PROTECTION DEVICE AND METHOD

(71) Applicant: MIPRO ELECTRONICS CO., LTD., Chiayi (TW)

(72) Inventor: Yi-Nan Tsai, Chiayi (TW)

(73) Assignee: MIPRO ELECTRONICS CO., LTD., Chiayi (TW)

( * ) Notice: Subject to any disclaimer, the term of this patent is extended or adjusted under 35 U.S.C. 154(b) by 498 days.

(21) Appl. No.: 17/700,454

(22) Filed: Mar. 21, 2022

(65) Prior Publication Data

US 2023/0299597 A1    Sep. 21, 2023

(51) Int. Cl.
    *H02J 7/00*    (2006.01)
(52) U.S. Cl.
    CPC ........ *H02J 7/0034* (2013.01); *H02J 7/00038* (2020.01); *H02J 7/0031* (2013.01)
(58) Field of Classification Search
    USPC ........................................................ 320/134
    See application file for complete search history.

(56) References Cited

U.S. PATENT DOCUMENTS

| | | | | |
|---|---|---|---|---|
| 5,475,294 A * | 12/1995 | Isoda | ..................... | H01M 10/46 320/132 |
| 6,043,625 A * | 3/2000 | Dowe | .................. | H02J 7/00047 320/110 |
| 10,749,358 B2 * | 8/2020 | Shibata | .................. | H02J 7/0047 |
| 2009/0243546 A1 * | 10/2009 | Sakurai | ................. | H02J 7/0034 320/134 |
| 2016/0219664 A1 | 7/2016 | Ellenberger | | |
| 2021/0218251 A1 | 7/2021 | Chettiar et al. | | |
| 2021/0376648 A1 | 12/2021 | Huang | | |

FOREIGN PATENT DOCUMENTS

| | | |
|---|---|---|
| CN | 101267614 A | 9/2008 |
| CN | 102570558 A | 7/2012 |

OTHER PUBLICATIONS

Search Report issued to European counterpart application No. 22163554.3 by the EPO on Sep. 2, 2022.
A Search Report, which was issued to European counterpart application No. 22213958.6 by the EPO on Apr. 12, 2023.
Search Report appended to an Office Action, which was issued to Taiwanese counterpart application No. 110143797 by the TIPO on Sep. 28, 2022, with an English translation thereof.

* cited by examiner

*Primary Examiner* — Samuel Berhanu
(74) *Attorney, Agent, or Firm* — Muncy, Geissler, Olds & Lowe, P.C.

(57) ABSTRACT

A battery charge and discharge protection method is to be implemented by a battery charge and discharge protection device, and controls power transfer to a load device based on results of detections of whether each of two batteries is correctly installed or reversely installed and whether each of the batteries is rechargeable or non-rechargeable. When any one of the batteries is reversely installed, power transfer from the batteries to the load device is disabled. When both of the batteries are correctly installed, the batteries are connected in parallel if they are both rechargeable and in series if they are both non-rechargeable, and power transfer from the batteries to the load device is enabled.

17 Claims, 5 Drawing Sheets

BATTERY CHARGE AND DISCHARGE PROTECTION DEVICE AND METHOD

FIELD

The disclosure relates to battery charge and discharge techniques, and more particularly to a battery charge and discharge protection device and a battery charge and discharge protection method.

BACKGROUND

Batteries can be classified into two types: non-rechargeable batteries (e.g., zinc-carbon batteries) and rechargeable batteries (e.g., lithium-ion batteries). For use in various electronic products, the rechargeable batteries are usually designed to be in standardized sizes such as AA size, or AAA size, etc., as are the non-rechargeable batteries. Therefore, many users often cannot discern which type of battery is being used, and may accidentally use batteries of different types together in a single electronic product.

When installing batteries in an electronic product, all of the batteries should be correctly installed, otherwise the batteries may discharge abnormally and may even cause damage to the electronic product. In addition, power management modules in many electronic products are designed to allow batteries to supply power while being charged at the same time. Once batteries of different types are installed in a single electronic product and the electronic product is coupled to a charger device for charging, the non-rechargeable battery(ies) and the rechargeable battery(ies) would be charged at the same time. This may greatly affect the charge efficiency of the rechargeable battery(ies), and may cause the non-rechargeable battery(ies) to explode because of overheating.

SUMMARY

Therefore, an object of the disclosure is to provide a battery charge and discharge protection device and a battery charge and discharge protection method that can alleviate at least one drawback of the prior art.

According to an aspect of the disclosure, the battery charge and discharge protection device is adapted to be coupled to a load device and a charger device, and is adapted to be installed with a number (N) of batteries, where N≥2. The battery charge and discharge protection device includes a battery polarity detecting unit, a battery type detecting unit and a charge and discharge control unit. The battery polarity detecting unit is adapted to be coupled to the batteries, and is configured to detect, with respect to each of the batteries, whether the battery is correctly installed or reversely installed, so as to generate a first detection result. The battery type detecting unit is disposed and configured to detect, with respect to each of the batteries, whether the battery is rechargeable or non-rechargeable, so as to generate a second detection result. The charge and discharge control unit is coupled to the battery polarity detecting unit and the battery type detecting unit to receive the first and second detection results, and is adapted to be further coupled to the load device, the charger device and the batteries. When the charge and discharge control unit determines based on the first detection result that at least one of the batteries is reversely installed, the charge and discharge control unit disables power transfer from the batteries to the load device, and disables power transfer from the charger device to the batteries. When the charge and discharge control unit determines based on the first detection result that all of the batteries are correctly installed and determines based on the second detection result that all of the batteries are rechargeable, the charge and discharge control unit connects the batteries in parallel, enables power transfer from the batteries that have been connected in parallel to the load device, and enables power transfer from the charger device to the batteries that have been connected in parallel. When the charge and discharge control unit determines based on the first detection result that all of the batteries are correctly installed and determines based on the second detection result that at least one of the batteries is non-rechargeable, the charge and discharge control unit connects the batteries in series, enables power transfer from the batteries that have been connected in series to the load device, and disables power transfer from the charger device to the batteries that have been connected in series.

According to another aspect of the disclosure, the battery charge and discharge protection device is adapted to be coupled to a load device and a charger device, and is adapted to be installed with two batteries. The battery charge and discharge protection device includes a battery polarity detecting unit, a battery type detecting unit and a charge and discharge control unit. The battery polarity detecting unit is adapted to be coupled to the batteries, and is configured to detect, with respect to each of the batteries, whether the battery is correctly installed or reversely installed, so as to generate a first detection result. The battery type detecting unit is disposed and configured to detect, with respect to each of the batteries, whether the battery is rechargeable or non-rechargeable, so as to generate a second detection result. The charge and discharge control unit is coupled to the battery polarity detecting unit and the battery type detecting unit to receive the first and second detection results, and is adapted to be further coupled to the load device, the charger device and the batteries. When the charge and discharge control unit determines based on the first detection result that at least one of the batteries is reversely installed, the charge and discharge control unit disables power transfer from the batteries to the load device, and disables power transfer from the charger device to the batteries. When the charge and discharge control unit determines based on the first detection result that both of the batteries are correctly installed and determines based on the second detection result that both of the batteries are rechargeable, the charge and discharge control unit connects the batteries in parallel, enables power transfer from the batteries that have been connected in parallel to the load device, and enables power transfer from the charger device to the batteries that have been connected in parallel. When the charge and discharge control unit determines based on the first detection result that both of the batteries are correctly installed and determines based on the second detection result that only one of the batteries is rechargeable, the charge and discharge control unit enables power transfer from the battery that is determined to be rechargeable to the load device, and enables power transfer from the charger device to the battery that is determined to be rechargeable.

According to yet another aspect of the disclosure, the battery charge and discharge protection method is to be implemented by a battery charge and discharge protection device that is coupled to a load device and that is to be installed with two batteries. The battery charge and discharge protection method includes steps of: (A) detecting, with respect to each of the batteries, whether the battery is correctly installed or reversely installed, so as to generate a first detection result; (B) detecting, with respect to each of the batteries, whether the battery is rechargeable or non-rechargeable, so as to generate a second detection result; and (C) controlling power transfer to the load device based on the first and second detection results. Step (C) includes: when determining based on the first detection result that at least one of the batteries is reversely installed, disabling power transfer from the batteries to the load device; when determining based on the first detection result that both of the batteries are correctly installed and determining based on the second detection result that both of the batteries are rechargeable, connecting the batteries in parallel, and enabling power transfer from the batteries that have been connected in parallel to the load device; and when determining based on the first detection result that both of the batteries are correctly installed and determining based on the second detection result that both of the batteries are non-rechargeable, connecting the batteries in series, and enabling power transfer from the batteries that have been connected in series to the load device.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
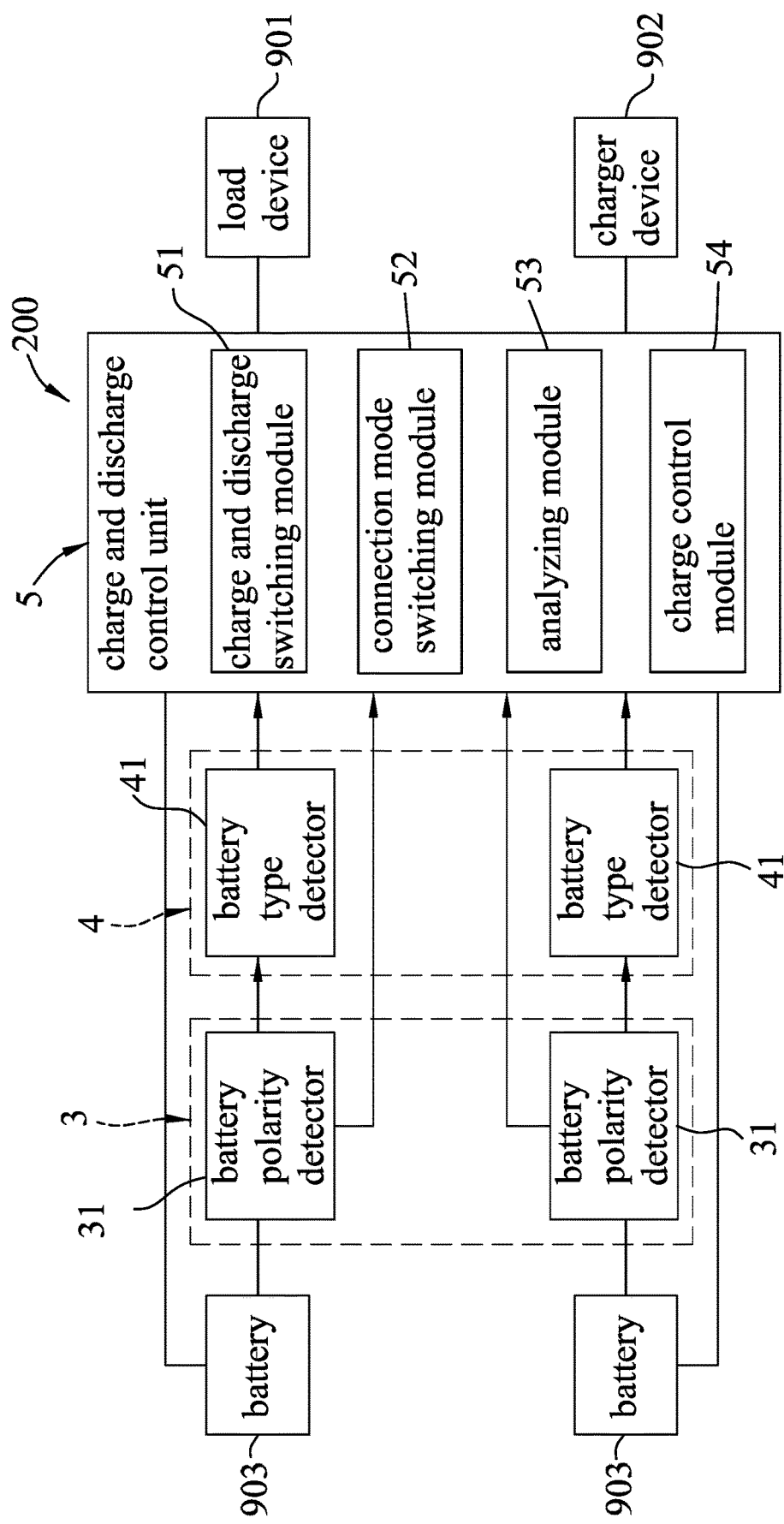
FIG. 1 is a block diagram illustrating a first embodiment of a battery charge and discharge protection device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
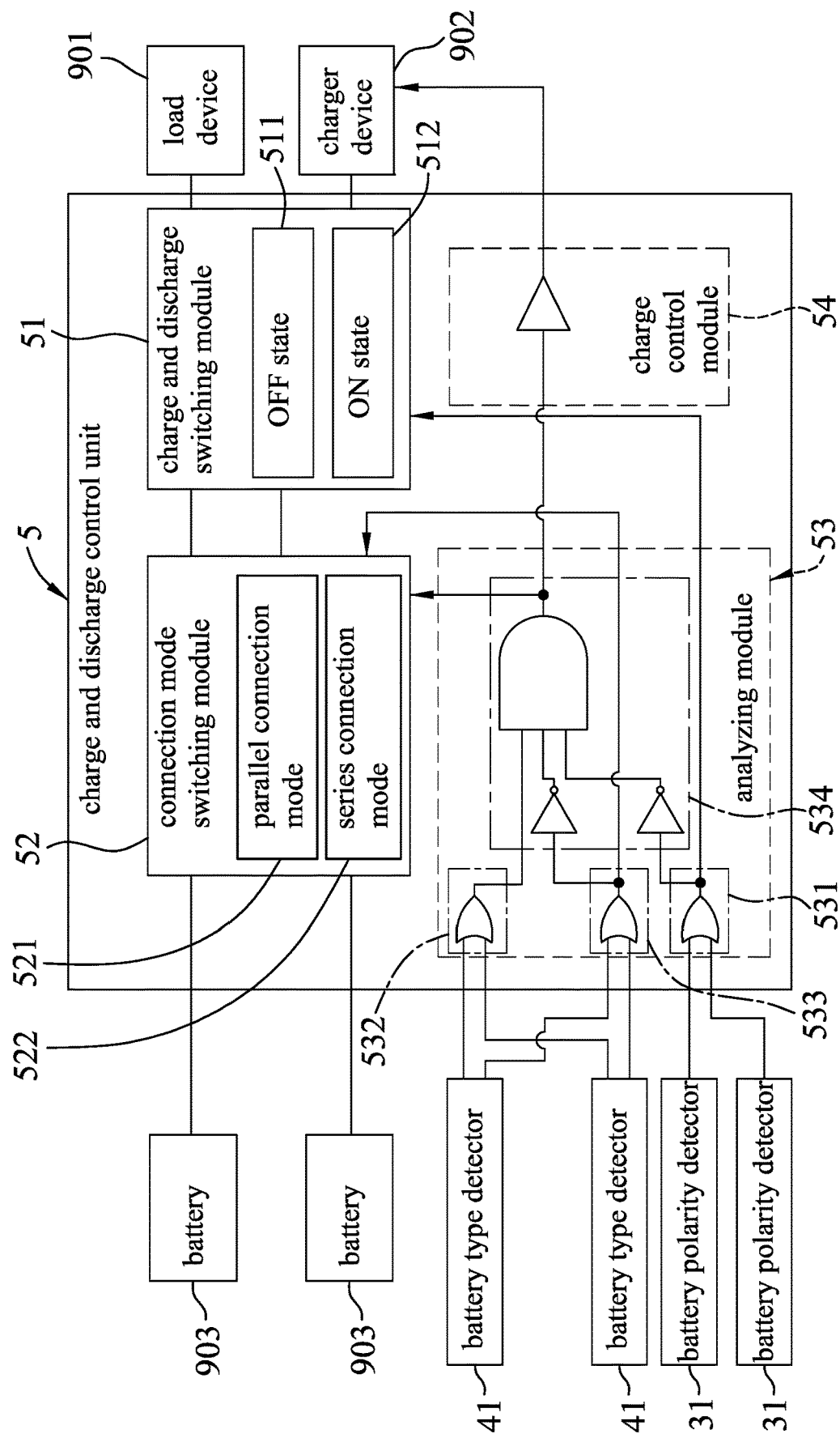
FIG. 2 is a circuit block diagram illustrating the first embodiment.

Referring to FIGS. 1 and 2, a first embodiment of a battery charge and discharge protection device 200 according to the disclosure is adapted to be coupled to a load device 901 and a charger device 902, and is adapted to be installed with two or more batteries 903. Each of the batteries 903 may be non-rechargeable or rechargeable. The battery charge and discharge protection device 200 controls power transfer among the load device 901, the charger device 902 and the batteries 903 based on detection results of, with respect to each of the batteries 903, whether the battery 903 is correctly installed or reversely installed and whether the battery 903 is rechargeable or non-rechargeable. The battery charge and discharge protection device 200 may be integrated with the load device 901 in an electronic product such as a speaker or a microphone, but the disclosure is not limited to such configurations. For illustration purposes, the battery charge and discharge protection device 200 is installed with two batteries 903 in this embodiment.

The battery charge and discharge protection device 200 includes a battery polarity detecting unit 3 that is adapted to be coupled to the batteries 903, a battery type detecting unit 4 that is coupled to the battery polarity detecting unit 3, and a charge and discharge control unit 5 that is coupled to the battery polarity detecting unit 3 and the battery type detecting unit 4 and that is adapted to be further coupled to the load device 901, the charger device 902 and the batteries 903. In an example, the battery charge and discharge protection device 200 further includes a battery holder (not shown) for accommodating the batteries 903, and the battery polarity detecting unit 3 and the charge and discharge control unit 5 are coupled to the batteries 903 via the battery holder. Since there are many ways to implement the battery holder, and since the salient features of the disclosure does not reside in the battery holder, details of the battery holder are omitted herein for the sake of brevity.

The battery polarity detecting unit 3 includes two battery polarity detectors 31 that respectively correspond to the batteries 903. The battery type detecting unit 4 includes two battery type detectors 41 that respectively correspond to the batteries 903. With respect to each of the batteries 903, the corresponding battery polarity detector 31 is coupled to the battery 903, and the corresponding battery type detector 41 is coupled to the corresponding battery polarity detector 31.

With respect to each of the batteries 903, the corresponding battery polarity detector 31 detects whether the battery 903 is correctly installed or reversely installed to generate a first detection signal, and connects the battery 903 to or disconnects the battery 903 from the corresponding battery type detector 41 based on the first detection signal. When the corresponding battery polarity detector 31 determines that the battery 903 is reversely installed, the corresponding battery polarity detector 31 causes the first detection signal to be at, for example, a logic "1" level, and disconnects the battery 903 from the corresponding battery type detector 41. When the corresponding battery polarity detector 31 determines that the battery 903 is correctly installed, the corresponding battery polarity detector 31 causes the first detection signal to be at, for example, a logic "0" level, and connects the battery 903 to the corresponding battery type detector 41. The first detection signals that are respectively generated by the battery polarity detectors 31 collectively constitute a first detection result.

Since there are many existing ways to implement the battery polarity detectors 31 (e.g., using diode circuits or transistor circuits to determine the polarities of the batteries 903), details of the battery polarity detectors 31 are omitted herein for the sake of brevity.

With respect to each of the batteries 903, the corresponding battery type detector 41, when being connected to the battery 903 by the corresponding battery polarity detector 31, detects whether the battery 903 is rechargeable or non-rechargeable to generate a type detection output. The type detection output includes a second detection signal, and an inverted second detection signal that is complementary to the second detection signal. When the corresponding battery type detector 41 determines that the battery 903 is rechargeable, the corresponding battery type detector 41 causes the second detection signal to be at, for example, a logic "1" level, and causes the inverted second detection signal to be at, for example, a logic "0" level. When the corresponding battery type detector 41 determines that the battery 903 is non-rechargeable, the corresponding battery type detector 41 causes the second detection signal to be at, for example, a logic "0" level, and causes the inverted second detection signal to be at, for example, a logic "1" level. The type detection outputs that are respectively generated by the battery type detectors 41 collectively constitute a second detection result.

A voltage across a rechargeable battery is different from a voltage across a non-rechargeable battery in magnitude. For example, a voltage across a non-rechargeable zinc-carbon battery has a magnitude that falls within a range of from 0.6V to 1.5V, and a voltage across a rechargeable lithium-ion battery has a magnitude that falls within a range of from 3V to 4.2V. In this embodiment, each of the battery type detectors 41 detects a voltage across the corresponding battery 903, and determines, based on the voltage thus detected, whether the corresponding battery 903 is rechargeable or non-rechargeable. However, the disclosure is not limited to such a configuration. Since there are many other ways to implement the battery type detectors 41, and since the important features of the disclosure do not reside in the implementation of the battery type detectors 41, other details of the battery type detectors 41 are omitted herein for the sake of brevity.

The charge and discharge control unit 5 includes a charge and discharge switching module 51, a connection mode switching module 52, an analyzing module 53 and a charge control module 54.

The charge and discharge switching module 51 is adapted to be coupled to the load device 901 and the charger device 902, and is operable in a plurality of states that include an OFF state 511 and an ON state 512.

The connection mode switching module 52 is adapted to be coupled to the batteries 903, is further coupled to the charge and discharge switching module 51, and is operable in a plurality of connection modes that include a parallel connection mode 521 and a series connection mode 522.

The charge and discharge switching module 51 performs the following: (a) when operating in the OFF state 511, preventing transmission of power that is received from the connection mode switching module 52 to the load device 901; and (b) when operating in the ON state 512, permitting transmission of power that is received from the connection mode switching module 52 to the load device 901 and transmission of power that is received from the charger device 902 to the connection mode switching module 52.

The connection mode switching module 52 performs the following: (a) when operating in the parallel connection mode 521, connecting the batteries 903 in parallel, and permitting transmission of power that is received from the parallel connected batteries 903 to the charge and discharge switching module 51 and transmission of power that is received from the charge and discharge switching module 51 to the parallel connected batteries 903; and (b) when operating in the series connection mode 522, connecting the batteries 903 in series, and permitting transmission of power that is received from the series connected batteries 903 to the charge and discharge switching module 51.

The analyzing module 53 is coupled to the battery polarity detecting unit 3 and the battery type detecting unit 4 to receive the first and second detection results, and is further coupled to the charge and discharge switching module 51 and the connection mode switching module 52. Based on analysis of the first and second detection results, the analyzing module 53 controls switching of the charge and discharge switching module 51 between the OFF state 511 and the ON state 512 and switching of the connection mode switching module 52 between the parallel connection mode 521 and the series connection mode 522.

The analyzing module 53 includes a first logic circuit 531, a second logic circuit 532, a third logic circuit 533 and a fourth logic circuit 534.

The first logic circuit 531 is coupled to the battery polarity detectors 31 to receive the first detection signals, is further coupled to the charge and discharge switching module 51, and generates, based on the first detection signals, a first logic signal that indicates whether both of the batteries 903 are correctly installed and that is for receipt by the charge and discharge switching module 51. The first logic signal causes the charge and discharge switching module 51 to operate in the ON state 512 when indicating that both of the batteries 903 are correctly installed, and causes the charge and discharge switching module 51 to operate in the OFF state 511 when indicating that the batteries 903 are not both correctly installed (i.e., at least one of the batteries 903 is reversely installed). In this embodiment, the first logic circuit 531 includes an OR gate. The OR gate has two input terminals that are respectively coupled to the battery polarity detectors 31 to respectively receive the first detection signals, and an output terminal that is coupled to the charge and discharge switching module 51 and that provides the first logic signal. When any one of the first detection signals is at the logic "1" level, the first logic signal is at a logic "1" level to indicate that the batteries 903 are not both correctly installed. When both of the first detection signals are at the logic "0" level, the first logic signal is at a logic "0" level to indicate that both of the batteries 903 are correctly installed.

The second logic circuit 532 is coupled to the battery type detectors 41 to receive the second detection signals, and generates, based on the second detection signals, a second logic signal that indicates whether both of the batteries 903 are non-rechargeable. In this embodiment, the second logic circuit 532 includes an OR gate. The OR gate has two input terminals that are respectively coupled to the battery type detectors 41 to respectively receive the second detection signals, and an output terminal that provides the second logic signal. When any one of the second detection signals is at the logic "1" level, the second logic signal is at a logic "1" level to indicate that the batteries 903 are not both non-rechargeable (i.e., at least one of the batteries 903 is rechargeable). When both of the second detection signals are at the logic "0" level, the second logic signal is at a logic "0" level to indicate that both of the batteries 903 are non-rechargeable.

The third logic circuit 533 is coupled to the battery type detectors 41 to receive the inverted second detection signals, is further coupled to the connection mode switching module 52, and generates, based on the inverted second detection signals, a third logic signal that indicates whether both of the batteries 903 are rechargeable and that is for receipt by the connection mode switching module 52. The third logic signal causes the connection mode switching module 52 to operate in the series connection mode 522 when indicating that the batteries 903 are not both rechargeable (i.e., at least one of the batteries 903 is non-rechargeable), and is dismissed as inconsequential when indicating that both of the batteries 903 are rechargeable. In this embodiment, the third logic circuit 533 includes an OR gate. The OR gate has two input terminals that are respectively coupled to the battery type detectors 41 to respectively receive the inverted second detection signals, and an output terminal that is coupled to the connection mode switching module 52 and that provides the third logic signal. When any one of the inverted second detection signals is at the logic "1" level, the third logic signal is at a logic "1" level to indicate that the batteries 903 are not both rechargeable. When both of the inverting second detection signals are at the logic "0" level, the third logic signal is at a logic "0" level to indicate that both of the batteries 903 are rechargeable.

The fourth logic circuit 534 is coupled to the first to third logic circuits 531-533 to receive the first to third logic signals, is further coupled to the connection mode switching module 52, and generates a fourth logic signal based on the first to third logic signals for receipt by the connection mode switching module 52. The fourth logic signal causes the connection mode switching module 52 to operate in the parallel connection mode 522 when all of the following conditions are met: the first logic signal indicates that both of the batteries 903 are correctly installed; the second logic signal indicates that the batteries 903 are not both non-rechargeable; and the third logic signal indicates that both of the batteries 903 are rechargeable. The fourth logic signal does not matter when otherwise.

In this embodiment, the fourth logic circuit 534 includes a first inverter, a second inverter and an AND gate. The first inverter has an input terminal that is coupled to the output terminal of the OR gate of the first logic circuit 531, and an output terminal. The second inverter has an input terminal that is coupled to the output terminal of the OR gate of the third logic circuit 533, and an output terminal. The AND gate has three input terminals that are respectively coupled to the output terminal of the OR gate of the second logic circuit 532, the output terminal of the first inverter and the output terminal of the second inverter. The AND gate further has an output terminal that is coupled to the connection mode switching module 52 and that provides the fourth logic signal. When the first detection result indicates that both of the batteries 903 are correctly installed and the second detection result indicates that both of the batteries 903 are rechargeable, the first logic signal is at the logic "0" level, the second logic signal is at the logic "1" level, the third logic signal is at the logic "0" level, and the fourth logic signal is at a logic "1" level so as to cause the connection mode switching module 52 to operate in the parallel connection mode 521. When the first detection result indicates that both of the batteries 903 are correctly installed and the second detection result indicates that only one of the batteries 903 is rechargeable, the first logic signal is at the logic "0" level, the second logic signal is at the logic "1" level, the third logic signal is at the logic "1" level so as to cause the connection mode switching module 52 to operate in the series connection mode 522, and the fourth logic signal is at a logic "0" level. When the first detection result indicates that both of the batteries 903 are correctly installed and the second detection result indicates that both of the batteries 903 are non-rechargeable, the first logic signal is at the logic "0" level, the second logic signal is at the logic "0" level, the third logic signal is at the logic "1" level so as to cause the connection mode switching module 52 to operate in the series connection mode 522, and the fourth logic signal is at the logic "0" level.

The charge control module 54 is adapted to be coupled to the charger device 902, is further coupled to the fourth logic circuit 534 to receive the fourth logic signal, controls the charger device 902 to output power to the charge and discharge switching module 51 when the fourth logic signal causes the connection mode switching module 52 to operate in the parallel connection mode 521 (i.e., the fourth logic signal is at the logic "1" level), and controls the charger device 902 to not output power to the charge and discharge switching module 51 when otherwise (i.e., the fourth logic signal is at the logic "0" level). In this embodiment, the charge control module 54 includes a buffer. The buffer has an input terminal that is coupled to the output terminal of the AND gate of the fourth logic circuit 534 to receive the fourth logic signal, and an output terminal that is adapted to be coupled to the charger device 902 and that provides an output control signal. When the fourth logic signal is at the logic "1" level, the output control signal is at a logic "1" level so as to cause the charger device 902 to output power to the charge and discharge switching module 51. When the fourth logic signal is at the logic "0" level, the output control signal is at a logic "0" level so as to cause the charger device 902 to not output power to the charge and discharge switching module 51.

Figure 3:
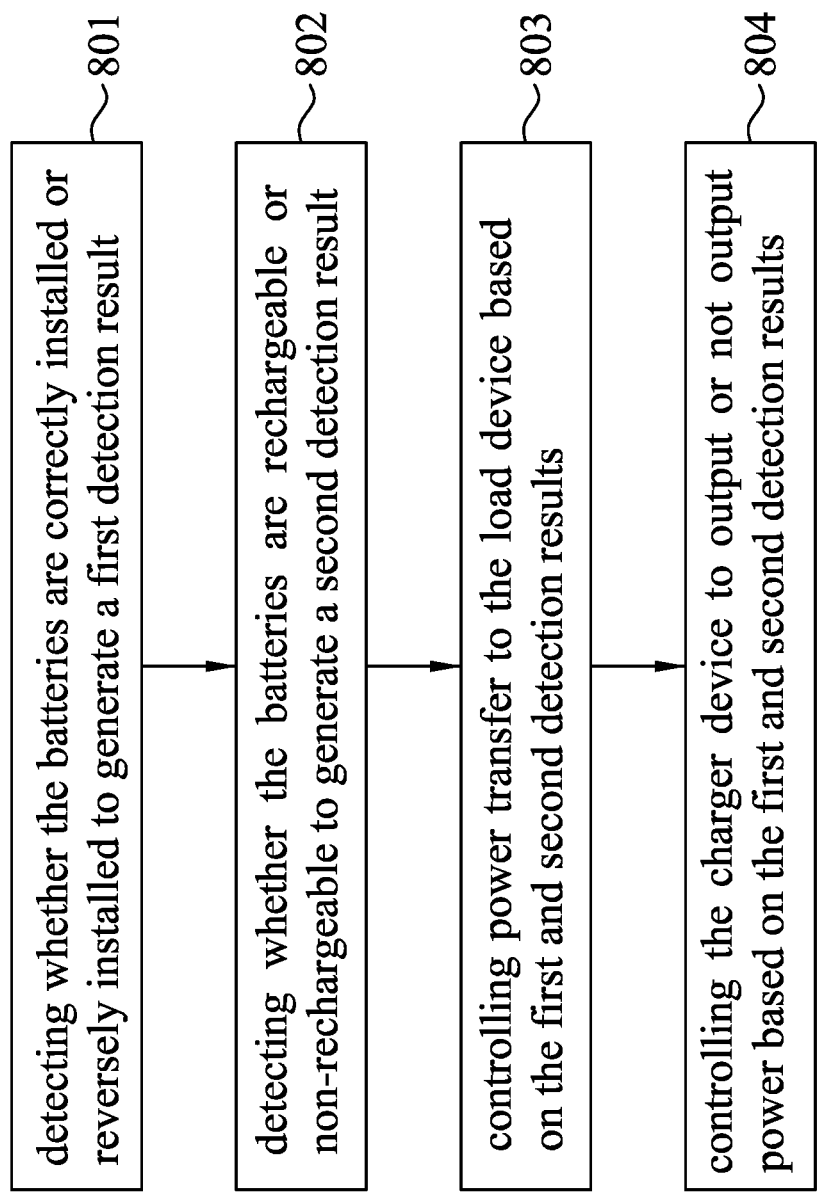
FIG. 3 is a flowchart illustrating a battery charge and discharge protection method performed by the first embodiment.

Referring to FIGS. 1, 2 and 3, a battery charge and discharge protection method performed by the battery charge and discharge protection device 200 of this embodiment includes the following steps.

In step 801, the battery polarity detecting unit 3 detects, with respect to each of the batteries 903, whether the battery 903 is correctly installed or reversely installed, so as to generate the first detection result. In addition, with respect to each of the batteries 903, the battery polarity detecting unit 3 connects the battery 903 to the battery type detecting unit 4 when the first detection result indicates that the battery 903 is correctly installed.

In step 802, the battery type detecting unit 4, when being connected to any one of the batteries 903 by the battery polarity detecting unit 3, detects whether the battery 903 is rechargeable or non-rechargeable, so as to generate the second detection result.

In step 803, the charge and discharge control unit controls power transfer to the load device 901 based on the first and second detection results.

In step 804, the charge and discharge control unit controls the charger device 902 to output or not output power to the charge and discharge control unit 5 based on the first and second detection results.

To be specific, when the analyzing module 53 determines based on the first detection result that at least one of the batteries 903 is reversely installed, the analyzing module 53 controls the charge and discharge switching module 51 to operate in the OFF state 511, and controls, via the charge control module 54, the charger device 902 to not output power, so as to disable power transfer from the batteries 903 to the load device 901 and power transfer from the charger device 902 to the batteries 903. Therefore, both of the batteries 903 are neither supplying power to the load device 901, nor being charged by the charger device 902. When the analyzing module 53 determines based on the first detection result that both of the batteries 903 are correctly installed and determines based on the second detection result that both of the batteries 903 are rechargeable, the analyzing module 53 controls the charge and discharge switching module 51 to operate in the ON state 512, controls the connection mode switching module 52 to operate in the parallel connection mode 521, and controls, via the charge control module 54, the charger device 902 to output power, so as to connect the batteries 903 in parallel, and enable power transfer from the parallel connected batteries 903 to the load device 901 and power transfer from the charger device 902 to the parallel connected batteries 903. Therefore, both of the batteries 903 are supplying power to the load device 901, and are being charged by the charger device 902. When the analyzing module 53 determines based on the first detection result that both of the batteries 903 are correctly installed and determines based on the second detection result that at least one of the batteries 903 is non-rechargeable, the analyzing module 53 controls the charge and discharge switching module 51 to operate in the ON state 512, controls the connection mode switching module 52 to operate in the series connection mode 522, and controls, via the charge control module 54, the charger device 902 to not output power, so as to connect the batteries 903 in series, enable power transfer from the series connected batteries 903 to the load device 901, and disable power transfer from the charger device 902 to the series connected batteries 903. Therefore, both of the batteries 903 are supplying power to the load device 901, and none of the batteries 903 are being charged by the charger device 902.

In view of the above, the battery charge and discharge protection device 200 of this embodiment prevents the batteries 903 from supplying power to the load device 901 when at least one of the batteries 903 is reversely installed. In addition, when both of the batteries 903 are correctly installed, based on the types of the batteries 903, the battery charge and discharge protection device 200 of this embodiment automatically connects the batteries 903 in parallel or in series, and automatically determines whether to charge the batteries 903 or not.

It should be noted that this embodiment is described in detail from a scenario where the battery charge and discharge protection device 200 is installed with two batteries 903. However, the number of the batteries 903 is not limited to two, and can be increased. When the number of the batteries 903 is increased, the number of the battery polarity detectors 31 and the number of the battery type detectors 41 should be increased as well.

In addition, the analyzing module 53 is not limited to the aforesaid configuration. There are many other ways to implement the analyzing module 53. For example, the analyzing module 53 may be implemented using transistor circuits and/or a combination of a microprocessor and software.

Figure 4:
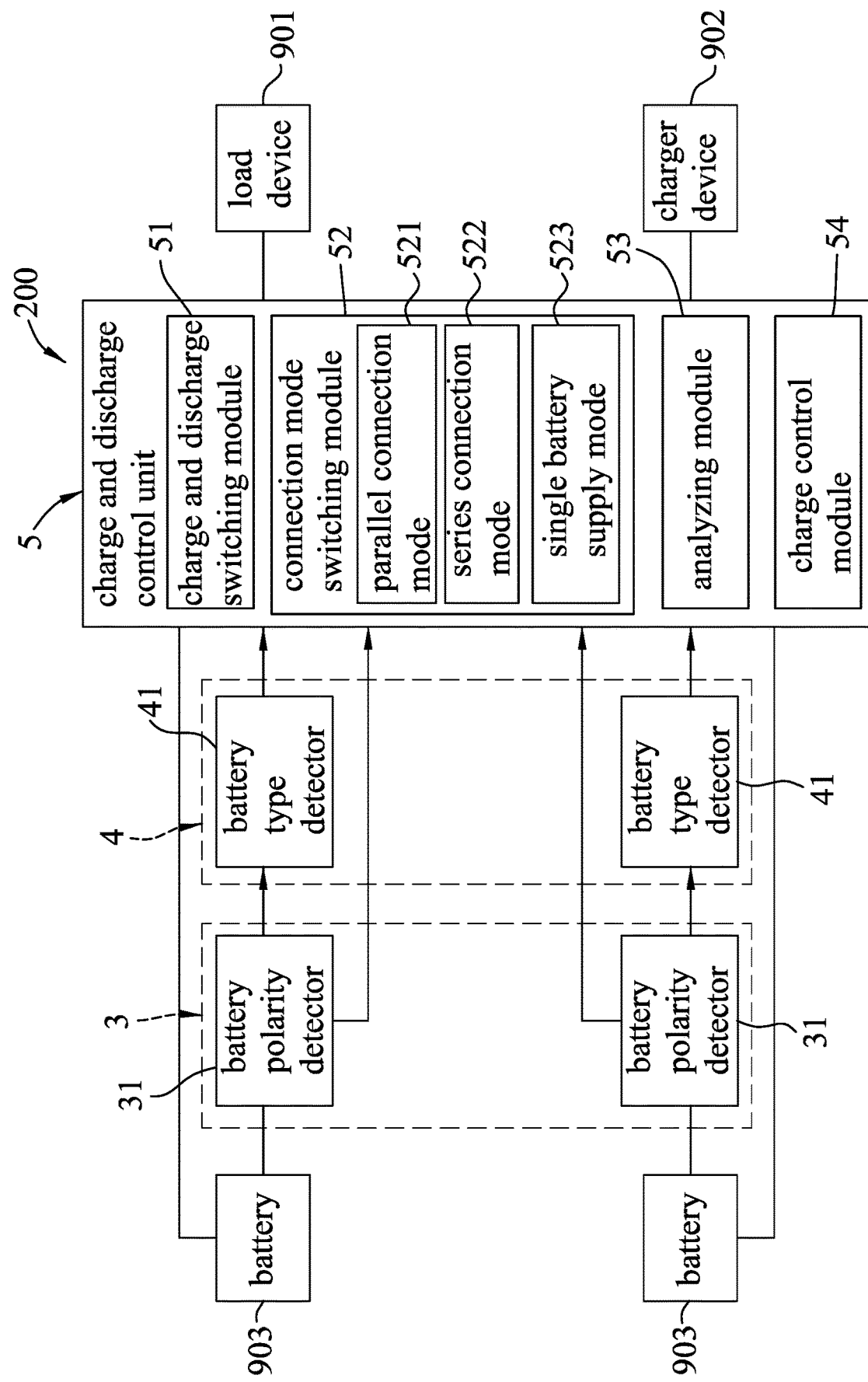
FIG. 4 is a block diagram illustrating a second embodiment of the battery charge and discharge protection device according to the disclosure.
Figure 5:
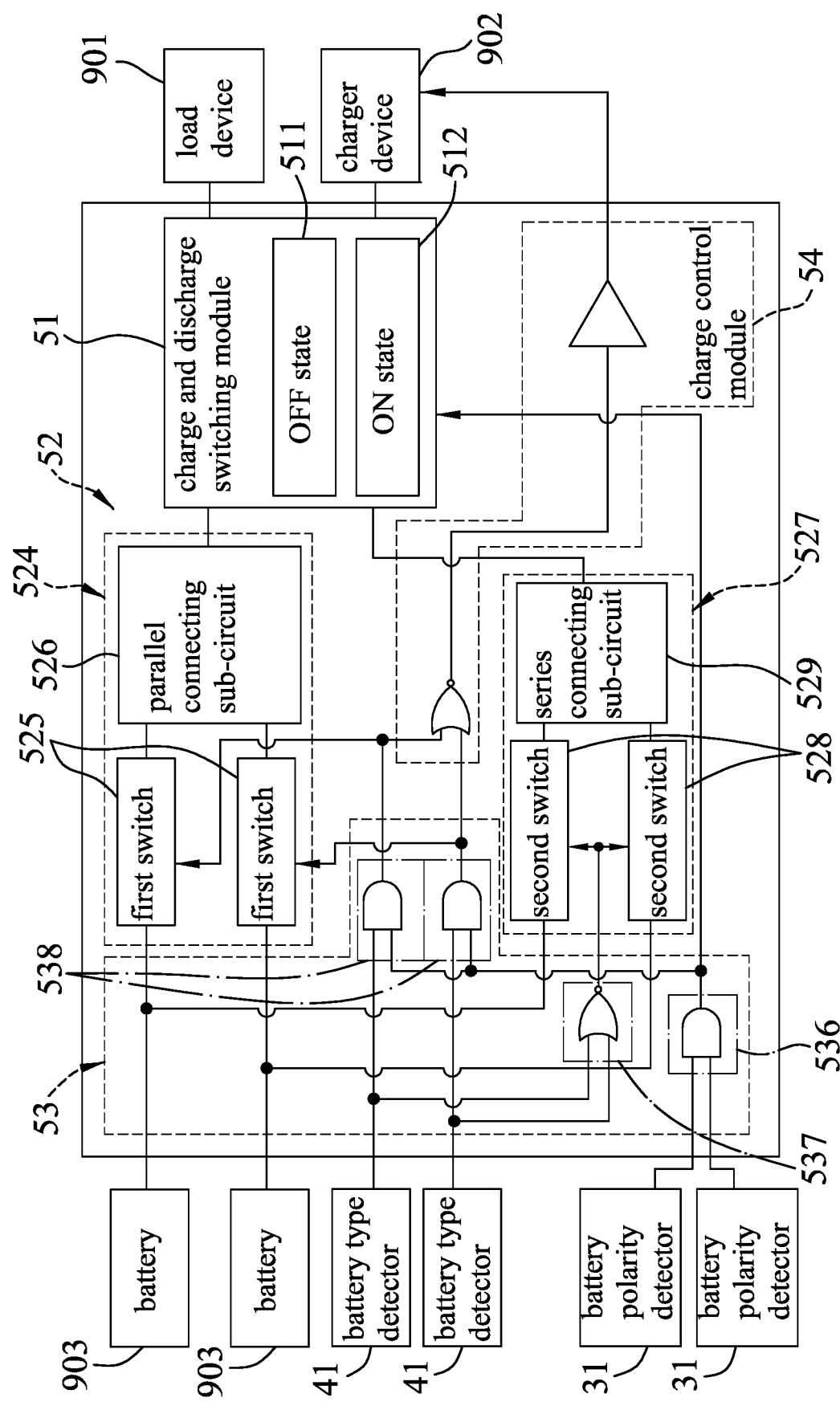
FIG. 5 is a circuit block diagram illustrating the second embodiment.

Referring to FIGS. 4 and 5, a second embodiment of the battery charge and discharge protection device 200 according to the disclosure is similar to the first embodiment, but differs from the first embodiment in what will be described below.

In the second embodiment, with respect to each of the battery polarity detectors 31, the first detection signal generated by the battery polarity detector 31 is at the logic "1" level when the battery polarity detector 31 determines that the corresponding battery 903 is correctly installed, and is at the logic "0" level when the battery polarity detector 31 determines that the corresponding battery 903 is reversely installed.

The connection modes further include a single battery supply mode 523, and the connection mode switching module 52 includes a parallel connection mode circuit 524 and a series connection mode circuit 527.

The parallel connection mode circuit 524 includes two first switches 525 that respectively correspond to the batteries 903, and a parallel connecting sub-circuit 526. Each of the first switches 525 is adapted to be coupled to the corresponding battery 903. The parallel connecting sub-circuit 526 is coupled to the first switches 525 and the charge and discharge switching module 51.

The series connection mode circuit 527 includes two second switches 528 that respectively correspond to the batteries 903, and a series connecting sub-circuit 529. Each of the second switches 528 is adapted to be coupled to the corresponding battery 903. The series connecting sub-circuit 529 is coupled to the second switches 528 and the charge and discharge switching module 51.

The analyzing module 53 includes a first logic circuit 536, a second logic circuit 537 and two third logic circuits 538.

The first logic circuit 536 is coupled to the battery polarity detectors 31 to receive the first detection signals, is further coupled to the charge and discharge switching module 51, and generates, based on the first detection signals, a first logic signal that indicates whether both of the batteries 903 are correctly installed and that is for receipt by the charge and discharge switching module 51. The first logic signal causes the charge and discharge switching module 51 to operate in the ON state 512 when indicating that both of the batteries 903 are correctly installed, and causes the charge and discharge switching module 51 to operate in the OFF state 511 when indicating that the batteries 903 are not both correctly installed (i.e., at least one of the batteries 903 is reversely installed). In this embodiment, the first logic circuit 536 includes an AND gate. The AND gate has two input terminals that are respectively coupled to the battery polarity detectors 31 to respectively receive the first detection signals, and an output terminal that is coupled to the charge and discharge switching module 51 and that provides the first logic signal. When both of the first detection signals are at the logic "1" level, the first logic signal is at a logic "1" level to indicate that both of the batteries 903 are correctly installed. When any one of the first detection signals is at the logic "0" level, the first logic signal is at a logic "0" level to indicate that the batteries 903 are not both correctly installed.

The second logic circuit 537 is coupled to the battery type detectors 41 to receive the second detection signals, is further coupled to the second switches 528, and generates, based on the second detection signals, a second logic signal that indicates whether both of the batteries 903 are non-rechargeable and that is for receipt by the second switches 528. The second logic signal causes the second switches 528 to conduct (i.e., causing the connection mode switching module 52 to operate in the series connection mode 522) when indicating that both of the batteries 903 are non-rechargeable, and causes the second switches 528 to not conduct when indicating that the batteries 903 are not both non-rechargeable (i.e., at least one of the batteries 903 is rechargeable). When both of the second switches 528 conduct, the second switches 528 respectively connect the batteries 903 to the series connecting sub-circuit 529, and the series connecting sub-circuit 529 connects the batteries 903 in series, and permits transmission of power that is received from the series connected batteries 903 to the charge and discharge switching module 51. In this embodiment, the second logic circuit 537 includes a NOR gate. The NOR gate has two input terminals that are respectively coupled to the battery type detectors 41 to respectively receive the second detection signals, and an output terminal that is coupled to the second switches 528 and that provides the second logic signal. When both of the second detection signals are at the logic "0" level, the second logic signal is at a logic "1" level to indicate that both of the batteries 903 are non-rechargeable. When any one of the second detection signals is at the logic "1" level, the second logic signal is at a logic "0" level to indicate that the batteries 903 are not both non-rechargeable.

The third logic circuits 538 respectively correspond to the batteries 903. With respect to each of the batteries 903, the corresponding third logic circuit 538 is coupled to the first logic circuit 536 and the corresponding battery type detector 41 to receive the first logic signal and the second detection signal, is further coupled to the corresponding first switch 525, and generates, based on the first logic signal and the second detection signal, a third logic signal that is for receipt by the corresponding first switch 525 and that controls switching of the corresponding first switch 525 between conduction and non-conduction. In this embodiment, the corresponding third logic circuit 538 includes an AND gate. The AND gate has two input terminals that are respectively coupled to the first logic circuit 536 and the corresponding battery type detector 41 to respectively receive the first logic signal and the second detection signal, and an output terminal that is coupled to the corresponding first switch 525 and that provides the third logic signal. When both of the first logic signal and the second detection signal are at the logic "1" level, the third logic signal is at a logic "1" level so as to cause the corresponding first switch 525 to conduct. When any one of the first logic signal and the second detection signal is at the logic "0" level, the third logic signal is at a logic "0" level so as to cause the corresponding first switch 525 to not conduct.

Therefore, when the first logic signal indicates that both of the batteries 903 are correctly installed and the second detection signals collectively indicate that both of the batteries 903 are rechargeable, the third logic signals that are respectively generated by the third logic circuits 538 respectively cause the first switches 525 to conduct (i.e., collectively causing the connection mode switching module 52 to operate in the parallel connection mode 521). When the first logic signal indicates that both of the batteries 903 are correctly installed and the second detection signals collectively indicate that only one of the batteries 903 is rechargeable, the third logic signals will cause only one of the first switches 525 to conduct (i.e., collectively causing the connection mode switching module 52 to operate in the single battery supply mode 523). Otherwise, the third logic signals respectively cause the first switches 525 to not conduct.

When both of the first switches 525 conduct, the first switches 525 respectively connect the batteries 903 to the parallel connecting sub-circuit 526, and the parallel connecting sub-circuit 526 connects the batteries 903 in parallel, permits transmission of power that is received from the parallel connected batteries 903 to the charge and discharge switching module 51, and permits transmission of power that is received from the charge and discharge switching module 51 to the parallel connected batteries 903. When only one of the first switches 525 conducts, the conducting first switch 525 connects the corresponding battery 903 to the parallel connecting sub-circuit 526, the non-conducting first switch 525 disconnects the corresponding battery 903 from the parallel connecting sub-circuit 526, and the parallel connecting sub-circuit 526 permits transmission of power, that is, permitting power received from the battery 903 connected to the parallel connecting sub-circuit 526 to transmit to the charge and discharge switching module 51 and power received from the charge and discharge switching module 51 to transmit to the battery 903 that is connected to the parallel connecting sub-circuit 526.

The charge control module 54 is coupled to the third logic circuits 538 to receive the third logic signals, controls the charger device 902 to output power to the charge and discharge switching module 51 when the third logic signals collectively cause the connection mode switching module 52 to operate in any one of the parallel connection mode 521 and the single battery supply mode 523, and controls the charger device 902 to not output power to the charge and discharge switching module 51 when otherwise. In this embodiment, the charge control module 54 includes a NOR gate and a buffer. The NOR gate has two input terminals that are respectively coupled to the output terminals of the AND gates of the third logic circuits 538 to respectively receive the third logic signals, and an output terminal. The buffer has an input terminal that is coupled to the output terminal of the NOR gate, and an output terminal that is adapted to be coupled to the charger device 902 and that provides an output control signal. When any one of the third logic signals is at the logic "1" level, the output control signal is at a logic "0" level so as to cause the charger device 902 to output power to the charge and discharge switching module 51. When both of the third logic signals are at the logic "0" level, the output control signal is at a logic "1" level so as to cause the charger device 902 to not output power to the charge and discharge switching module 51.

Therefore, when the analyzing module 53 determines based on the first detection result that at least one of the batteries 903 is reversely installed, the analyzing module 53 controls the charge and discharge switching module 51 to operate in the OFF state 511, and controls, via the charge control module 54, the charger device 902 to not output power, so as to disable power transfer from the batteries 903 to the load device 901 and power transfer from the charger device 902 to the batteries 903. Therefore, both of the batteries 903 are neither supplying power to the load device 901, nor being charged by the charger device 902. When the analyzing module 53 determines based on the first detection result that both of the batteries 903 are correctly installed and determines based on the second detection result that both of the batteries 903 are rechargeable, the analyzing module 53 controls the charge and discharge switching module 51 to operate in the ON state 512, controls the connection mode switching module 52 to operate in the parallel connection mode 521, and controls, via the charge control module 54, the charger device 902 to output power, so as to connect the batteries 903 in parallel, and enable power transfer from the parallel connected batteries 903 to the load device 901 and power transfer from the charger device 902 to the parallel connected batteries 903. Therefore, both of the batteries 903 are supplying power to the load device 901, and are being charged by the charger device 902. When the analyzing module 53 determines based on the first detection result that both of the batteries 903 are correctly installed and determines based on the second detection result that only one of the batteries 903 is rechargeable, the analyzing module 53 controls the charge and discharge switching module 51 to operate in the ON state 512, controls the connection mode switching module 52 to operate in the single battery supply mode 523, and controls, via the charge control module 54, the charger device 902 to output power, so as to enable power transfer from the battery 903 that is determined to be rechargeable to the load device 901 and power transfer from the charger device 902 to the battery 903 that is determined to be rechargeable. Therefore, only the battery 903 that is determined to be rechargeable is supplying power to the load device 901, and is being charged by the charger device 902. When the analyzing module 53 determines based on the first detection result that both of the batteries 903 are correctly installed and determines based on the second detection result that both of the batteries 903 are non-rechargeable, the analyzing module 53 controls the charge and discharge switching module 51 to operate in the ON state 512, controls the connection mode switching module 52 to operate in the series connection mode 522, and controls, via the charge control module 54, the charger device 902 to not output power, so as to connect the batteries 903 in series, enable power transfer from the series connected batteries 903 to the load device 901, and disable power transfer from the charger device 902 to the series connected batteries 903. Therefore, both of the batteries 903 are supplying power to the load device 901, and none of the batteries 903 are being charged by the charger device 902.

In view of the above, since the battery charge and discharge protection device 200 of this embodiment prevents the batteries 903 from supplying power to the load device 901 when at least one of the batteries 903 is reversely installed, the load device 901 would not be damaged by the reversely installed battery(ies) 903, if any. In addition, in a scenario where both of the batteries 903 are correctly installed, the battery charge and discharge protection device 200 of this embodiment performs one of the following actions based on the types of the batteries 903: when both of the batteries 903 are rechargeable, connecting the batteries 903 in parallel, and permitting the parallel connected batteries 903 to supply power to the load device 903; when only one of the batteries 903 is rechargeable, permitting the rechargeable battery 903 to supply power to the load device 903; and when both of the batteries 903 are non-rechargeable, connecting the batteries 903 in series, and permitting the series connected batteries 903 to supply power to the load device 903, thereby optimizing power transfer from the batteries 903 to the load device 903. Moreover, in the aforesaid scenario, when any one of the batteries 903 is rechargeable, the battery charge and discharge protection device 200 of this embodiment controls the charger device 902 to output power, and uses the power outputted by the charger device 902 to charge the rechargeable battery(ies) 903.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A battery charge and discharge protection device adapted to be coupled to a load device and a charger device, and adapted to be installed with a number (N) of batteries, where N≥2, said battery charge and discharge protection device comprising:
    a battery polarity detecting unit adapted to be coupled to the batteries, and configured to detect, with respect to each of the batteries, whether the battery is correctly installed or reversely installed, so as to generate a first detection result;
    a battery type detecting unit disposed and configured to detect, with respect to each of the batteries, whether the battery is rechargeable or non-rechargeable, so as to generate a second detection result; and
    a charge and discharge control unit coupled to said battery polarity detecting unit and said battery type detecting unit to receive the first and second detection results, and adapted to be further coupled to the load device, the charger device and the batteries;
    when said charge and discharge control unit determines based on the first detection result that at least one of the batteries is reversely installed, said charge and discharge control unit disabling power transfer from the batteries to the load device, and disabling power transfer from the charger device to the batteries;
    when said charge and discharge control unit determines based on the first detection result that all of the batteries are correctly installed and determines based on the second detection result that all of the batteries are rechargeable, said charge and discharge control unit connecting the batteries in parallel, enabling power transfer from the batteries that have been connected in parallel to the load device, and enabling power transfer from the charger device to the batteries that have been connected in parallel;
    when said charge and discharge control unit determines based on the first detection result that all of the batteries are correctly installed and determines based on the second detection result that at least one of the batteries is non-rechargeable, said charge and discharge control unit connecting the batteries in series, enabling power transfer from the batteries that have been connected in series to the load device, and disabling power transfer from the charger device to the batteries that have been connected in series.

2. The battery charge and discharge protection device of claim 1, wherein said charge and discharge control unit includes:
    a charge and discharge switching module adapted to be coupled to the load device and the charger device, and operable in a plurality of states that include an OFF state and an ON state;
    a connection mode switching module adapted to be coupled to the batteries, further coupled to said charge and discharge switching module, and operable in a plurality of connection modes that include a parallel connection mode and a series connection mode;
    said charge and discharge switching module, when operating in the OFF state, preventing transmission of power that is received from said connection mode switching module to the load device;
    said charge and discharge switching module, when operating in the ON state, permitting transmission of power that is received from said connection mode switching module to the load device and transmission of power that is received from the charger device to said connection mode switching module;
    when said connection mode switching module operates in the parallel connection mode, said connection mode switching module connecting the batteries in parallel, and permitting transmission of power that is received from the batteries that have been connected in parallel to said charge and discharge switching module and transmission of power that is received from said charge and discharge switching module to the batteries that have been connected in parallel;

when said connection mode switching module operates in the series connection mode, said connection mode switching module connecting the batteries in series, and permitting transmission of power that is received from the batteries that have been connected in series to said charge and discharge switching module;

an analyzing module coupled to said battery polarity detecting unit and said battery type detecting unit to receive the first and second detection results, and further coupled to said charge and discharge switching module and said connection mode switching module;

said analyzing module controlling, based on analysis of the first and second detection results, switching of said charge and discharge switching module between the OFF state and the ON state and switching of said connection mode switching module between the parallel connection mode and the series connection mode; and a charge control module adapted to be coupled to the charger device, and further coupled to said analyzing module;

when said analyzing module controls said connection mode switching module to operate in the parallel connection mode, said charge control module controlling the charger device to output power to said charge and discharge switching module.

3. The battery charge and discharge protection device of claim 2, wherein said analyzing module includes:

a first logic circuit coupled to said battery polarity detecting unit to receive the first detection result, further coupled to said charge and discharge switching module, and generating, based on the first detection result, a first logic signal that indicates whether all of the batteries are correctly installed and that is for receipt by said charge and discharge switching module;

the first logic signal, when indicating that all of the batteries are correctly installed, causing said charge and discharge switching module to operate in the ON state;

a second logic circuit coupled to said battery type detecting unit to receive the second detection result, and generating, based on the second detection result, a second logic signal that indicates whether all of the batteries are non-rechargeable;

a third logic circuit coupled to said battery type detecting unit to receive the second detection result, further coupled to said connection mode switching module, and generating, based on the second detection result, a third logic signal that indicates whether all of the batteries are rechargeable and that is for receipt by said connection mode switching module;

the third logic signal, when indicating that not all of the batteries are rechargeable, causing said connection mode switching module to operate in the series connection mode; and a fourth logic circuit coupled to said first to third logic circuits to receive the first to third logic signals, further coupled to said connection mode switching module, and generating a fourth logic signal for receipt by said connection mode switching module based on the first to third logic signals;

when the first logic signal indicates that all of the batteries are correctly installed, when the second logic signal indicates that not all of the batteries are non-rechargeable, and when the third logic signal indicates that all of the batteries are rechargeable, the fourth logic signal causing said connection mode switching module to operate in the parallel connection mode.

4. The battery charge and discharge protection device of claim 3, wherein said charge control module is coupled to said fourth logic circuit to receive the fourth logic signal, and controls the charger device to output power to said charge and discharge switching module when the fourth logic signal causes said connection mode switching module to operate in the parallel connection mode.

5. The battery charge and discharge protection device of claim 1, wherein:

said battery polarity detecting unit includes a number (N) of battery polarity detectors that respectively correspond to the batteries;

said battery type detecting unit includes a number (N) of battery type detectors that respectively correspond to the batteries; and with respect to each of the batteries,
said battery polarity detector that corresponds to the battery is coupled to the battery and said charge and discharge control unit,
said battery type detector that corresponds to the battery is coupled to said battery polarity detector that corresponds to the battery and said charge and discharge control unit,
said battery polarity detector that corresponds to the battery detects whether the battery is correctly installed or reversely installed to generate a first detection signal, and connects the battery to said battery type detector that corresponds to the battery when the first detection signal indicates that the battery is correctly installed, and
said battery type detector that corresponds to the battery, when being connected to the battery, detects whether the battery is rechargeable or non-rechargeable to generate a type detection output;

the first detection signals that are respectively generated by said battery polarity detectors collectively constitute the first detection result for receipt by said charge and discharge control unit;

the type detection outputs that are respectively generated by said battery type detectors collectively constitute the second detection result for receipt by said charge and discharge control unit.

6. A battery charge and discharge protection device adapted to be coupled to a load device and a charger device, and adapted to be installed with two batteries, said battery charge and discharge protection device comprising:

a battery polarity detecting unit adapted to be coupled to the batteries, and configured to detect, with respect to each of the batteries, whether the battery is correctly installed or reversely installed, so as to generate a first detection result;

a battery type detecting unit disposed and configured to detect, with respect to each of the batteries, whether the battery is rechargeable or non-rechargeable, so as to generate a second detection result; and a charge and discharge control unit coupled to said battery polarity detecting unit and said battery type detecting unit to receive the first and second detection results, and adapted to be further coupled to the load device, the charger device and the batteries;

when said charge and discharge control unit determines based on the first detection result that at least one of the batteries is reversely installed, said charge and discharge control unit disabling power transfer from the batteries to the load device, and disabling power transfer from the charger device to the batteries;

when said charge and discharge control unit determines based on the first detection result that both of the batteries are correctly installed and determines based on the second detection result that both of the batteries are rechargeable, said charge and discharge control unit connecting the batteries in parallel, enabling power transfer from the batteries that have been connected in parallel to the load device, and enabling power transfer from the charger device to the batteries that have been connected in parallel;

when said charge and discharge control unit determines based on the first detection result that both of the batteries are correctly installed and determines based on the second detection result that only one of the batteries is rechargeable, said charge and discharge control unit enabling power transfer from the battery that is determined to be rechargeable to the load device, and enabling power transfer from the charger device to the battery that is determined to be rechargeable.

7. The battery charge and discharge protection device of claim 6, wherein said charge and discharge control unit includes:

a charge and discharge switching module adapted to be coupled to the load device and the charger device, and operable in a plurality of states that include an OFF state and an ON state;

a connection mode switching module adapted to be coupled to the batteries, further coupled to said charge and discharge switching module, and operable in a plurality of connection modes that include a parallel connection mode and a single battery supply mode;

said charge and discharge switching module, when operating in the OFF state, preventing transmission of power that is received from said connection mode switching module to the load device;

said charge and discharge switching module, when operating in the ON state, permitting transmission of power that is received from said connection mode switching module to the load device and transmission of power that is received from the charger device to said connection mode switching module;

when said connection mode switching module operates in the parallel connection mode, said connection mode switching module connecting the batteries in parallel, and permitting transmission of power that is received from the batteries that have been connected in parallel to said charge and discharge switching module and transmission of power that is received from said charge and discharge switching module to the batteries that have been connected in parallel;

when said connection mode switching module operates in the single battery supply mode, said connection mode switching module permitting transmission of power that is received from the battery determined to be rechargeable to said charge and discharge switching module and transmission of power that is received from said charge and discharge switching module to the battery that is determined to be rechargeable; and an analyzing module coupled to said battery polarity detecting unit and said battery type detecting unit to receive the first and second detection results, and further coupled to said charge and discharge switching module and said connection mode switching module;

said analyzing module controlling, based on analysis of the first and second detection results, switching of said charge and discharge switching module between the OFF state and the ON state and switching of said connection mode switching module between the parallel connection mode and the single battery supply mode.

8. The battery charge and discharge protection device of claim 7, wherein:

the connection modes further includes a series connection mode;

when said connection mode switching module operates in the series connection mode, said connection mode switching module connects the batteries in series, and permits transmission of power that is received from the batteries that have been connected in series to said charge and discharge switching module;

said analyzing module, when determining based on the first detection result that both of the batteries are correctly installed and determining based on the second detection result that both of the batteries are non-rechargeable, controls said connection mode switching module to operate in the series connection mode;

said charge and discharge control unit further includes a charge control module that is adapted to be coupled to the charger device and that is further coupled to said analyzing module;

when said analyzing module controls said connection mode switching module to operate in any one of the parallel connection mode and the single battery supply mode, said charge control module controls the charger device to output power to said charge and discharge switching module.

9. The battery charge and discharge protection device of claim 8, wherein:

the second detection result includes two second detection signals which respectively correspond to the batteries, and each of which indicates whether the battery that corresponds to the second detection signal is rechargeable or non-rechargeable; and said analyzing module includes a first logic circuit coupled to said battery polarity detecting unit to receive the first detection result, further coupled to said charge and discharge switching module, and generating, based on the first detection result, a first logic signal that indicates whether both of the batteries are correctly installed and that is for receipt by said charge and discharge switching module, the first logic signal, when indicating that both of the batteries are correctly installed, causing said charge and discharge switching module to operate in the ON state, a second logic circuit coupled to said battery type detecting unit to receive the second detection result, further coupled to said connection mode switching module, and generating, based on the second detection result, a second logic signal that indicates whether both of the batteries are non-rechargeable and that is for receipt by said connection mode switching module, the second logic signal, when indicating that both of the batteries are non-rechargeable, causing said connection mode switching module to operate in the series connection mode, and two third logic circuits respectively corresponding to the batteries, with respect to each of the batteries, said third logic circuit that corresponds to the battery being coupled to said first logic circuit and said battery type detecting unit to receive the first logic signal and the second detection signal that corresponds to the battery, being further coupled to said connection mode switching module, and generating a third logic signal for receipt by said connection mode switching module based on the first logic signal and the second detection signal that corresponds to the battery, when the first logic signal indicates that both of the batteries are correctly installed, and when the second detection signals collectively indicate that both of the batteries are rechargeable, the third logic signals that are respectively generated by said third logic circuits collectively causing said connection mode switching module to operate in the parallel connection mode, when the first logic signal indicates that both of the batteries are correctly installed, and when the second detection signals collectively indicate that only one of the batteries is rechargeable, the third logic signals that are respectively generated by said third logic circuits collectively causing said connection mode switching module to operate in the single battery supply mode.

10. The battery charge and discharge protection device of claim 9, wherein:

said connection mode switching module includes a series connection mode circuit and a parallel connection mode circuit;

each of said series connection mode circuit and said parallel connection mode circuit is adapted to be coupled to the batteries, and is further coupled to said charge and discharge switching module;

when said connection mode switching module operates in the series connection mode, said series connection mode circuit connects the batteries in series, and permits transmission of power that is received from the batteries that have been connected in series to said charge and discharge switching module;

said parallel connection mode circuit includes two first switches that are adapted to be respectively coupled to the batteries, and a parallel connecting sub-circuit that is coupled to said first switches and said charge and discharge switching module;

each of said first switch is further coupled to said third logic circuit that corresponds to the battery coupled to said first switch to receive the third logic signal, and conducts to connect the battery that is coupled to said first switch to said parallel connecting sub-circuit when the third logic signal indicates that both of the batteries are correctly installed and that the battery coupled to said first switch is rechargeable;

when both of said first switches conduct, said parallel connecting sub-circuit connects the batteries in parallel, and permits transmission of power that is received from the batteries that have been connected in parallel to said charge and discharge switching module and transmission of power that is received from said charge and discharge switching module to the batteries that have been connected in parallel;

when only one of said first switches conducts, said parallel connecting sub-circuit permits transmission of power that is received from the battery connected to said parallel connecting sub-circuit to said charge and discharge switching module and transmission of power that is received from said charge and discharge switching module to the battery that is connected to said parallel connecting sub-circuit.

11. The battery charge and discharge protection device of claim 10, wherein:

said series connection mode circuit includes two second switches that are adapted to be respectively coupled to the batteries, and a series connecting sub-circuit that is coupled to said second switches and said charge and discharge switching module;

each of said second switches is further coupled to said second logic circuit to receive the second logic signal, and conducts to connect the battery that is coupled to said second switch to said series connecting sub-circuit when the second logic signal indicates that both of the batteries are non-rechargeable;

when both of said second switches conduct, said series connecting sub-circuit connects the batteries in series, and permits transmission of power that is received from the batteries that have been connected in series to said charge and discharge switching module.

12. The battery charge and discharge protection device of claim 9, wherein said charge control module is coupled to said third logic circuits to receive the third logic signals, and controls the charger device to output power to said charge and discharge switching module when the third logic signals collectively cause said connection mode switching module to operate in any one of the parallel connection mode and the single battery supply mode.

13. A battery charge and discharge protection method to be implemented by a battery charge and discharge protection device that is coupled to a load device and that is to be installed with two batteries, said battery charge and discharge protection method comprising steps of:

(A) detecting, with respect to each of the batteries, whether the battery is correctly installed or reversely installed, so as to generate a first detection result;

(B) detecting, with respect to each of the batteries, whether the battery is rechargeable or non-rechargeable, so as to generate a second detection result; and (C) controlling power transfer to the load device based on the first and second detection results;

wherein step (C) includes when determining based on the first detection result that at least one of the batteries is reversely installed, disabling power transfer from the batteries to the load device, when determining based on the first detection result that both of the batteries are correctly installed and determining based on the second detection result that both of the batteries are rechargeable, connecting the batteries in parallel, and enabling power transfer from the batteries that have been connected in parallel to the load device, and when determining based on the first detection result that both of the batteries are correctly installed and determining based on the second detection result that both of the batteries are non-rechargeable, connecting the batteries in series, and enabling power transfer from the batteries that have been connected in series to the load device.

14. The battery charge and discharge protection method of claim 13, the battery charge and discharge protection device being further coupled to a charger device, said battery charge and discharge protection method further comprising a step of:

(D) controlling the charger device to output or not output power to the charge and discharge protection device based on the first and second detection results;

wherein step (D) includes when determining based on the first detection result that at least one of the batteries is reversely installed, controlling the charger device to not output power to the charge and discharge protection device, when determining based on the first detection result that both of the batteries are correctly installed and determining based on the second detection result that both of the batteries are non-rechargeable, controlling the charger device to not output power to the charge and discharge protection device, and when determining based on the first detection result that both of the batteries are correctly installed and determining based on the second detection result that both of the batteries are rechargeable, controlling the charger device to output power to the charge and discharge protection device;

wherein step (C) further includes, when determining based on the first detection result that both of the batteries are correctly installed and determining based on the second detection result that both of the batteries are rechargeable, enabling power transfer from the charger device to the batteries that have been connected in parallel.

15. The battery charge and discharge protection method of claim 13, wherein step (C) further includes, when determining based on the first detection result that both of the batteries are correctly installed and determining based on the second detection result that only one of the batteries is rechargeable, enabling power transfer from the battery that is determined to be rechargeable to the load device.

16. The battery charge and discharge protection method of claim 15, the battery charge and discharge protection device being further coupled to a charger device, said battery charge and discharge protection method further comprising a step of:

(D) controlling the charger device to output or not output power to the charge and discharge protection device based on the first and second detection results;

wherein step (D) includes when determining based on the first detection result that at least one of the batteries is reversely installed, controlling the charger device to not output power to the charge and discharge protection device, when determining based on the first detection result that both of the batteries are correctly installed and determining based on the second detection result that both of the batteries are non-rechargeable, controlling the charger device to not output power to the charge and discharge protection device, when determining based on the first detection result that both of the batteries are correctly installed and determining based on the second detection result that both of the batteries are rechargeable, controlling the charger device to output power to the charge and discharge protection device, and when determining based on the first detection result that both of the batteries are correctly installed and determining based on the second detection result that only one of the batteries is rechargeable, controlling the charger device to output power to the charge and discharge protection device;

wherein step (C) further includes when determining based on the first detection result that both of the batteries are correctly installed and determining based on the second detection result that both of the batteries are rechargeable, enabling power transfer from the charger device to the batteries that have been connected in parallel, and when determining based on the first detection result that both of the batteries are correctly installed and determining based on the second detection result that only one of the batteries is rechargeable, enabling power transfer from the charger device to the battery that is determined to be rechargeable.

17. The battery charge and discharge protection method of claim 13, wherein step (C) further includes, when determining based on the first detection result that both of the batteries are correctly installed and determining based on the second detection result that only one of the batteries is rechargeable, connecting the batteries in series, and enabling power transfer from the batteries that have been connected in series to the load device.

\* \* \* \* \*